(12) United States Patent
Kodama

(10) Patent No.: US 12,469,961 B2
(45) Date of Patent: Nov. 11, 2025

(54) ANTENNA STRUCTURE AND ELECTRONIC WEARABLE DEVICE

(71) Applicant: GOERTEK INC., Shandong (CN)

(72) Inventor: Kenichiro Kodama, Shandong (CN)

(73) Assignee: GOERTEK INC., Shandong (CN)

( * ) Notice: Subject to any disclaimer, the term of this patent is extended or adjusted under 35 U.S.C. 154(b) by 0 days.

(21) Appl. No.: 18/007,195

(22) PCT Filed: Dec. 16, 2021

(86) PCT No.: PCT/CN2021/138650
§ 371 (c)(1),
(2) Date: Jan. 27, 2023

(87) PCT Pub. No.: WO2023/108521
PCT Pub. Date: Jun. 22, 2023

(65) Prior Publication Data
US 2024/0275030 A1 Aug. 15, 2024

(51) Int. Cl.
*H01Q 1/27* (2006.01)
*H01Q 1/48* (2006.01)
*H01Q 5/328* (2015.01)

(52) U.S. Cl.
CPC .............. *H01Q 1/273* (2013.01); *H01Q 1/48* (2013.01); *H01Q 5/328* (2015.01)

(58) Field of Classification Search
CPC .......... H01Q 1/273; H01Q 1/48; H01Q 5/328; H01Q 5/378; H01Q 9/42
See application file for complete search history.

(56) References Cited

U.S. PATENT DOCUMENTS

| | | | |
|---|---|---|---|
| 2008/0180333 A1* | 7/2008 | Martiskainen | H01Q 1/38 343/722 |
| 2015/0200448 A1 | 7/2015 | Tsai et al. | |
| 2015/0236422 A1 | 8/2015 | You et al. | |
| 2016/0006111 A1 | 1/2016 | Miskovský et al. | |
| 2017/0162948 A1* | 6/2017 | Wong | H01Q 13/10 |
| 2017/0279183 A1* | 9/2017 | Togashi | H01Q 1/245 |
| 2017/0279955 A1* | 9/2017 | Togashi | H01Q 1/273 |
| 2019/0067803 A1 | 2/2019 | Kang et al. | |

(Continued)

FOREIGN PATENT DOCUMENTS

| | | |
|---|---|---|
| CN | 101953022 A | 1/2011 |
| CN | 205723918 U | 11/2016 |

(Continued)

*Primary Examiner* — Dameon E Levi
*Assistant Examiner* — Michael M Bouizza
(74) *Attorney, Agent, or Firm* — Ingrassia Fisher & Lorenz, LLP

(57) ABSTRACT

An antenna structure and an electronic wearable device are provided. The antenna structure includes an antenna element, a grounding plate and a grounded element. The grounded element is electrically connected to the grounding plate to ground. The antenna element is mounted to the grounding plate, and is configured to transmit and receive wireless signals in a first wavelength band of a first wireless communication standard, and couple with the grounded element to transmit and receive wireless signals in a second wavelength band of a second wireless communication standard, where the first wavelength band is different from the second wavelength band.

16 Claims, 16 Drawing Sheets

(56) References Cited

U.S. PATENT DOCUMENTS

| | | | |
|---|---|---|---|
| 2019/0109367 A1 | 4/2019 | Tseng et al. | |
| 2019/0198983 A1* | 6/2019 | Moore | G02B 27/017 |
| 2020/0119433 A1* | 4/2020 | Ashwood | H05K 1/14 |
| 2020/0365974 A1 | 11/2020 | Wei et al. | |
| 2021/0359410 A1 | 11/2021 | Li et al. | |

FOREIGN PATENT DOCUMENTS

| | | |
|---|---|---|
| CN | 111052502 A | 4/2020 |
| CN | 112713386 A | 4/2021 |
| CN | 112909503 A | 6/2021 |
| EP | 3512036 A1 | 7/2019 |
| KR | 20130069125 A | 6/2013 |
| WO | 2015026527 A1 | 2/2015 |

* cited by examiner

ANT1@2.44GHz

ANT1@2.44GHz

ANT2@2.44GHz

ANT2@2.44GHz

ANT1@6GHz

ANT1@6GHz

ANT2@6GHz

ANT2@6GHz

ANTENNA STRUCTURE AND ELECTRONIC WEARABLE DEVICE

CROSS-REFERENCE TO RELATED APPLICATION

This Application is a U.S. National-Stage entry under 35 U.S.C. § 371 based on International Application No. PCT/CN2021/138650, filed Dec. 16, 2021 which is hereby incorporated herein in its entirety by reference.

TECHNICAL FIELD

This application pertains to the technical field of electronic devices, and in particular, to an antenna structure and an electronic wearable device.

BACKGROUND

Recent decades have witnessed prosperity of electronic wearable devices. Being designed properly, these devices are generally not handheld during usage, but are "worn" as accessories or even apparel on body parts of a user, i.e. a wearer. Hence, it is quite convenient for the wearer to interact with the outside world simultaneously in various manners. For example, a head-mounted display (HMD) is a display device, worn on the head or as part of a helmet. The HMD has a small display optic in front of one or each eye, which can reflect projected images and allows a user to see through it. For another example, electronic glasses may prompt the wearer with detailed content of instant messages, even when both bands of the wearer are occupied.

Rapid development of the batteries and the integrated circuits renders electronic wearable devices smaller sizes and more compact structures, which aims at merging them into each application scenario in people's daily life. Therefore, an increasing requirement on convenient "anytime and anywhere" accesses to the Internet and WLANs demands the electronic wearable devices wireless and portable. A prospect is that the electronic wearable devices are capable to provide high-quality wireless accesses in a wide frequency range while not increasing a size of the antenna in the electronic wearable device. Such objective raises great challenges on a robust design of the electronic wearable devices. In addition, other objects, desirable features and characteristics will become apparent from the subsequent summary and detailed description, and the appended claims, taken in conjunction with the accompanying drawings and this background.

SUMMARY

In view of the above, an antenna structure and an electronic wearable device are provided according to embodiments of the present disclosure, to widen a frequency range of the antenna in electronic wearable devices while not increasing the size of the antenna.

Following technical solutions are provided to achieve the above technical objective.

In a first aspect, an antenna structure is provided according to an embodiment of the present disclosure. The antenna structure includes an antenna element, a grounding plate and a grounded element. The grounded element is electrically connected to the grounding plate to ground. The antenna element is mounted to the grounding plate, and is configured to transmit and receive wireless signals in a first wavelength band of a first wireless communication standard, and couple with the grounded element to transmit and receive wireless signals in a second wavelength band of a second wireless communication standard, where the first wavelength band is different from the second wavelength band.

In one embodiment, the grounded element is in a stripe shape.

In one embodiment, the grounded element includes a first end electrically connected to the grounding plate, and a second end provided with a coupling portion. The coupling portion is configured to couple with the antenna element.

In one embodiment, a gap is between the antenna element and the coupling portion of the grounded element to form a coupling capacitance.

In one embodiment, the antenna element at least includes a first edge facing the coupling portion of the grounded element and a second edge perpendicular to the first edge. The first edge is longer than the second edge.

In one embodiment, a length of the coupling portion is equal to a length of the first edge of the antenna element.

In one embodiment, the antenna element is located in a region defined by the grounded element and the grounding plate.

In one embodiment, a front edge of the grounded element is aligned with an edge of the antenna element adjacent to the grounding plate.

In one embodiment, the second wavelength band is adjusted according to a parameter of the coupling capacitance.

In one embodiment, the parameter of the coupling capacitance includes at least one of a length of the coupling portion and a width of the gap.

In one embodiment, the grounded element, the grounding plate and the grounded element and the antenna element are located on a printed circuit board; or the antenna element, the grounding plate and the grounded element are integrated in a molded interconnect device by laser direct structuring.

In one embodiment, the antenna element is a monopole antenna, a dipole antenna, a loop antenna, or an inverted-F antenna.

In another aspect, an electronic wearable device is provided according to an embodiment of the present disclosure. The electronic wearable device includes at least one portion. The antenna structure as described above is disposed on a surface of the portion away from a user.

In one embodiment, the portion includes at least one metal portion, and the metal portion is disposed between the antenna structure and the user.

In one embodiment, the portion disposed with the antenna structure is separated from skin of the user when the electronic wearable device is worn by the user.

In one embodiment, the portion is located in front of an eye of the user, when the electronic wearable device is worn by the user.

In one embodiment, the electronic wearable device includes at least two portions, and the antenna structure is disposed on each of the at least two portions.

In one embodiment, the antenna structures are symmetrically disposed on surfaces of the at least two portions away from the user, respectively.

In one embodiment, the antenna structures form a multiple-input-multiple-output system or a diversity system.

In one embodiment, the two portions are located in front of eyes of the user respectively, when the electronic wearable device is worn by the user.

In one embodiment, the at least one portion is a lens.

In one embodiment, the electronic wearable device is eyeglasses, a helmet or a headwear display.

The antenna structure and the electronic wearable device are provided according to embodiments of the present disclosure. The antenna structure includes an antenna element, a grounding plate and a grounded element. The grounded element is electrically connected to the grounding plate to ground. The antenna element is mounted to the grounding plate, and is configured to transmit and receive wireless signals in a first wavelength band of a first wireless communication standard, and couple with the grounded element to transmit and receive wireless signals in a second wavelength band of a second wireless communication standard, where the first wavelength band is different from the second wavelength band. In the antenna structure, the antenna element couples with the grounded element to form a coupling antenna. In this way, the multiple and wider frequency can be covered by using the coupling antenna, without increasing the size of the antenna. Thus, a good antenna performance can be obtained when the user worn the electronic wearable device.

BRIEF DESCRIPTION OF THE DRAWINGS

The present invention will hereinafter be described in conjunction with the following drawing figures, wherein like numerals denote like elements, and.

DETAILED DESCRIPTION OF THE EMBODIMENTS

The following detailed description is merely exemplary in nature and is not intended to limit the invention or the application and uses of the invention. Furthermore, there is no intention to be bound by any theory presented in the preceding background of the invention or the following detailed description.

Hereinafter technical solutions in embodiments of the present disclosure are described in conjunction with the drawings in embodiments of the present closure. The described embodiments are only some rather than all of the embodiments of the present disclosure. Any other embodiments obtained based on the embodiments of the present disclosure by those skilled in the art without any creative effort fall within the scope of protection of the present disclosure.

It should be noted that, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

In an existing technology, a monopole antenna is installed into an electronic wearable device to receive and transmit wireless signals in a specific frequency range. If coverage frequency ranges need to become wider or more, the antenna size must be bigger in order to maintain the antenna perform. Thus, a prospect is that the electronic wearable devices are capable to provide high-quality wireless accesses in a wide frequency range while not increasing a size of the antenna in the electronic wearable device.

In view of the above, an antenna structure is provided according to an embodiment of the present disclosure. In the antenna structure according to an embodiment of the present disclosure, an antenna element transmits and receives wireless signals in a first wavelength band of a first wireless communication standard, and couples with the grounded element to transmit and receive wireless signals in a second wavelength band of a second wireless communication standard. Therefore, a wider frequency range can be covered without increasing the antenna size, and the antenna perform can be maintained.

Figure 1:
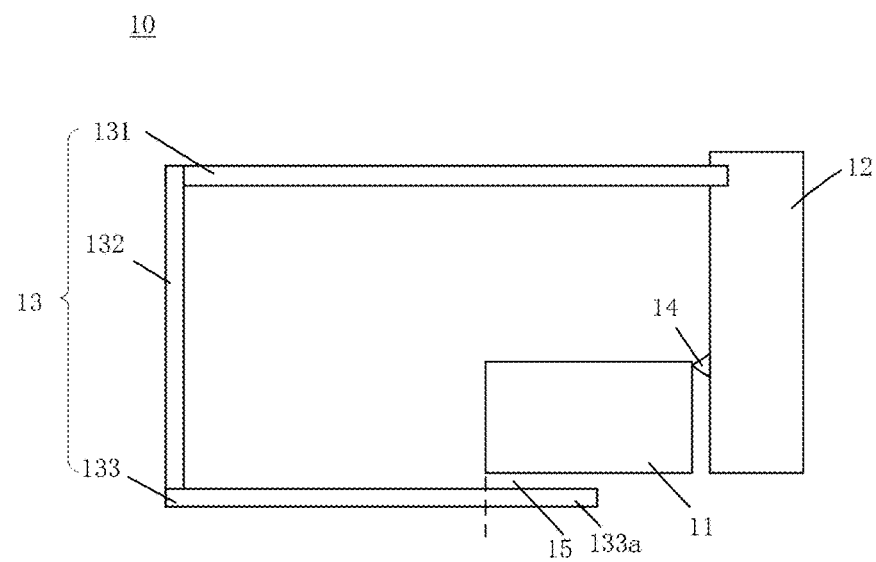
FIG. 1 is a schematic structural diagram of an antenna structure according to an embodiment of the present disclosure.

FIG. 1 is a schematic structural diagram of an antenna structure according to an embodiment of the present disclosure. In FIG. 1, the antenna structure 10 includes an antenna element 11, a grounding plate 12 and a grounded element 13.

The grounded element 13 is electrically connected to the grounding plate 12, and the grounding plate 12 is electrically connected to a ground of the electronic wearable device. Hence, the grounded element 13 is grounded via the grounding plate 12.

The antenna element 11 is mounted to the grounding plate 12, and is configured to transmit and receive wireless signals in a first wavelength band of a first wireless communication standard, and couple with the grounded element to transmit and receive wireless signals in a second wavelength band of a second wireless communication standard. The first wavelength band is different from the second wavelength band.

The first wavelength band, the second wavelength band, the first wireless communication standard and the second wireless communication standard are not specifically limited herein, which may be determined according to a practical requirement. For example, the first wireless communication standard is Wireless Fidelity (Wi-Fi), and the first wavelength band ranges from 5.17 GHz to 7.125 GHz. For another example, the first wireless communication standard is a wireless communication standard for cellular network, such as the 2G, 3G, 4G or 5G standard.

In an embodiment, the second wireless communication standard is Bluetooth®, and the second wavelength band ranges from 2.4 GHz to 2.48 GHz. For another example, the first wireless communication standard may be the same as the second wireless communication standard, both of which are Wi-Fi 6E.

In an embodiment, the antenna element 11 may be a monopole antenna, a dipole antenna, a loop antenna, or an inverted-F antenna. The antenna element 11 may be electrically connected to a radio-frequency coaxial cable via a feeding point 14.

The grounded element 13 may be in a stripe shape. As shown in FIG. 1, the grounded element 13 may include multiple sections in a bend stripe shape. Taking three sections as an example, the grounded element 13 may include a first section 131, a second section 132 and a third section 133, as shown in FIG. 1. The first section has an end electrically connected with the grounding plate 12 at a ground point and another end connected with one end of the second section 132. The other end of the second section 132 is further connected with the third section 133. The third section 133 is coupled with the antenna element 11.

In an embodiment, the first section 131 is connected to the grounding plate 12 in a direction perpendicular to the grounding plate 12. The first section 131 is parallel with the third section 133, and the second section 132 is perpendicular to the first section 131 and the third section 133. That is to say, three sections 131, 132 and 133 and the grounding plate 12 define a square region. It should be noted that the shape of grounded element 13 and the number of sections are not specifically limited herein, which may be designed according to a practical requirement.

In an embodiment, the antenna element 11 may be located in the square region which is defined by three sections 131, 132 and 133 and the grounding plate 12. The antenna element 11 at least includes a first edge and a second edge perpendicular to the first edge, wherein the first edge is longer than the second edge. In the example as shown in FIG. 1, the antenna element 11 is in a rectangle shape.

The third section 133 may include a coupling portion 133a. The coupling portion 133a is configured to couple with the antenna element 11. The coupling portion 133a is arranged at an end of the grounded element 13 away from the ground point. A gap 15 forms between the antenna element 11 and the coupling portion 133a of the grounded element 13 to form a coupling capacitance.

In the antenna structure according to the embodiment of the present disclose, the antenna element is used to transmit and receive wireless signals in a first wavelength band of a first wireless communication standard. In addition, the antenna element is further coupled with the grounded element to form a coupling antenna, so as to transmit and receive wireless signals in a second wavelength band of a second wireless communication standard. In this way, the multiple and wider frequency can be covered by using the coupling antenna, and a good antenna performance can be obtained when the user worn the electronic wearable device.

Figure 2:
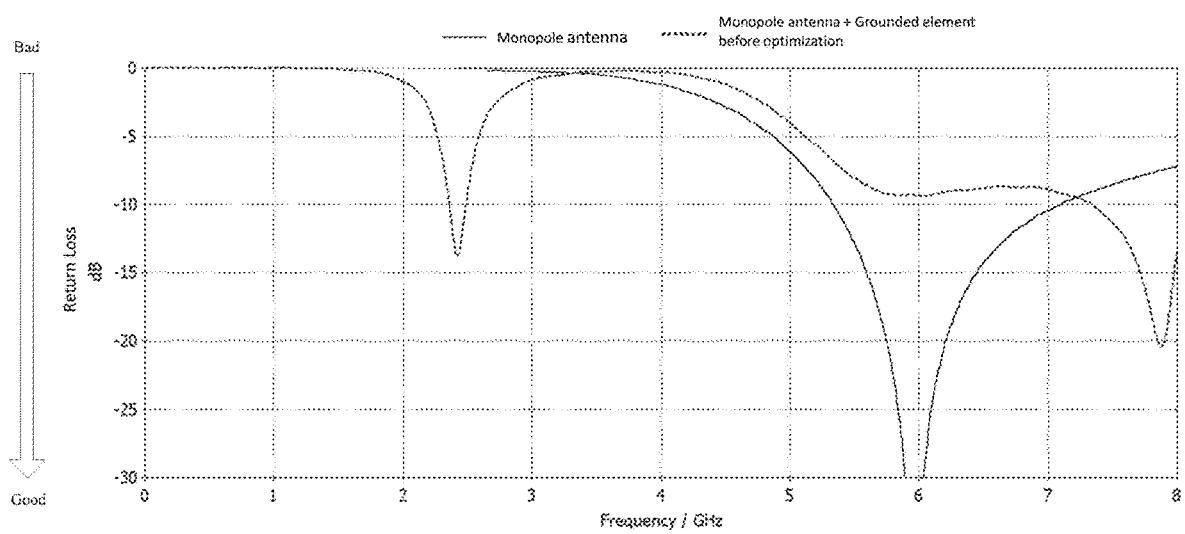
FIG. 2 is a simulation curve graph of a return loss for an antenna structure according to an embodiment of the present disclosure.

FIG. 2 is a simulation curve graph of a return loss for an antenna structure according to an embodiment of the present disclosure. In FIG. 2, the dotted line shows a simulation result of a return loss for a monopole antenna without a coupling capacitance, and the solid line shows a simulation result of a return loss for the antenna structure in which the monopole antenna is coupled with the grounded element. When only a standard monopole antenna is installed, no resonance for 2.4 GHz can be obtained. When the grounded element is added to the monopole antenna, the resonance for 2.4 GHz can be obtained by coupling the monopole antenna and the grounded element. However, as shown in FIG. 2, when the grounded element is added, the resonance for 5.17 to 7.15 GHz is holistically degraded. Thus, the antenna structure needs to be optimized.

In an embodiment, the antenna structure is optimized by adjusting a parameter of coupling capacitance. In the embodiment as shown in Figure, the antenna element 11 and the coupling portion 133a are used as electrode plates of the coupling capacitance. Generally, the capacitance may be determined based on an area of the electrode plate and a distance between two electrode plates. When the antenna structure is located on a printed circuit board, the thickness of conductor in the printed circuit board is fixed. For example, the thickness of copper in the printed circuit board is between 0.01 mm to 0.1 mm. Thus, the antenna structure may be optimized by adjusting at least one of a length of the coupling portion 133a and a width of the gap 15.

Figure 3:
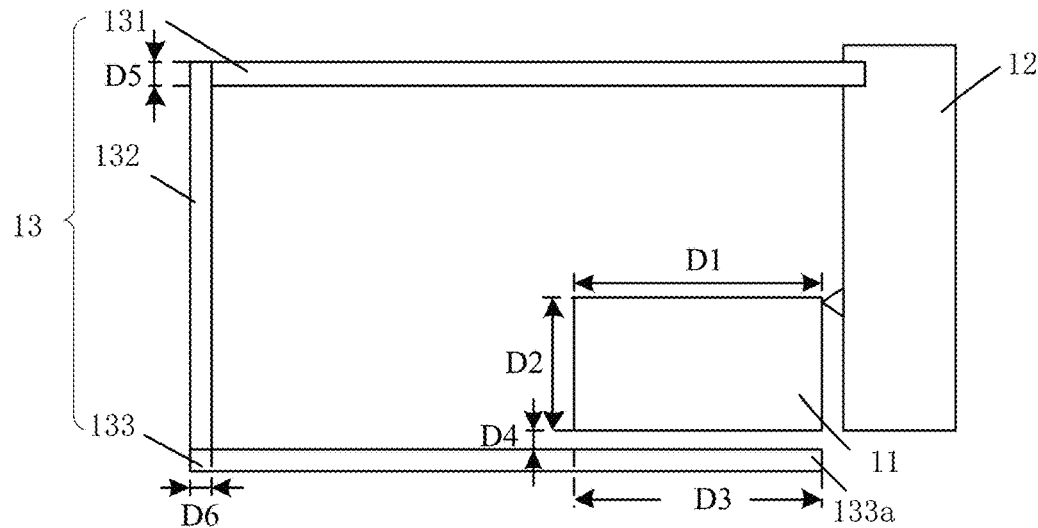
FIG. 3 is a schematic structural diagram of an antenna structure according to another embodiment of the present disclosure.

FIG. 3 is a schematic structural diagram of an antenna structure according to another embodiment of the present disclosure. As shown in FIG. 3, the antenna element 11 is in a rectangle shape, which has a first edge and a second edge shorter than the first edge. The coupling portion 133a is coupled with the first edge of the antenna element 11. In FIG. 3, D1 denotes the length of the first edge, D2 denotes the length of the second edge, D3 denotes the length of the coupling portion 133a and D4 denotes the width of the gap 15 between the antenna element 11 and the coupling portion 133a. The coupling capacitance may be calculated according to the following formula:

$$C(F) = \varepsilon r * \varepsilon 0 * (S/D4)$$

In the formula, C(F) denotes the coupling capacitance, εr denotes a relative permittivity of an electrode plate of the coupling capacitance, ε0 denotes a permittivity in vacuum of an electrode plate of the coupling capacitance, and S denotes an area of the electrode plate. In the case that the coupling portion 133a is coupled with the first edge of the antenna element 11, S is decided by D1 and D3.

In a preferred embodiment, D1 may be equal to D3. That is, the front edge of the grounded element 13 is aligned with an edge of the antenna element 11 adjacent to the grounding plate 12. In this case, an optimized antenna performance can be obtained.

Figure 4:
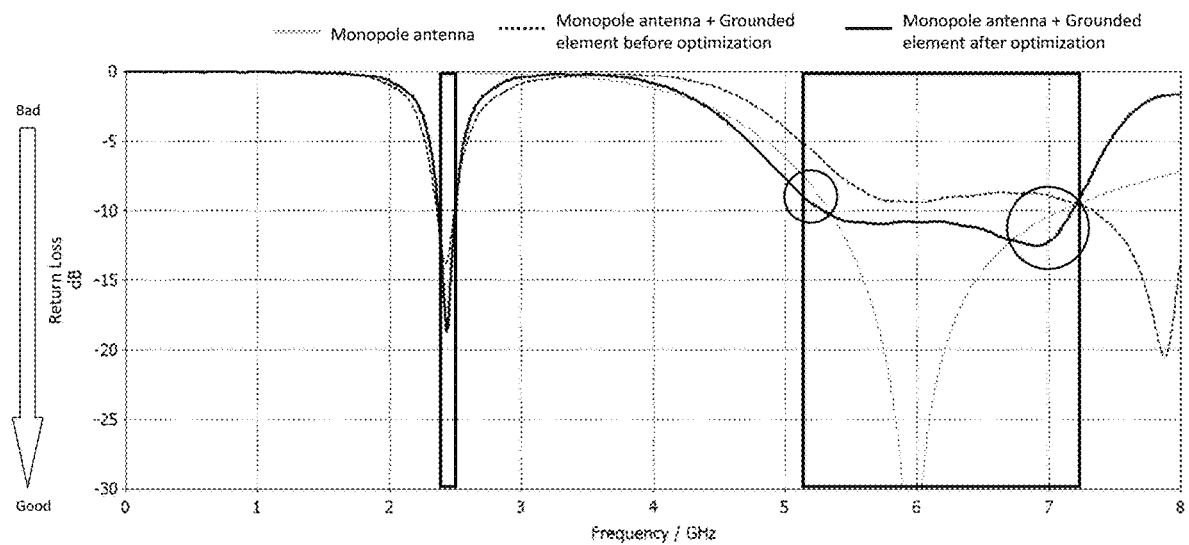
FIG. 4 is a simulation curve graph of a return loss for an antenna structure according to another embodiment of the present disclosure.

FIG. 4 is a simulation curve graph of a return loss for an antenna structure according to another embodiment of the present disclosure. In FIG. 4, the dotted line shows a simulation result of a return loss for a monopole antenna without a coupling capacitance, the gray line shows a simulation result of a return loss for the antenna structure before the optimization, and the black line shows a simulation result of the return loss for the antenna structure after the optimization. By optimizing the antenna structure, around 5.17 GHz and 7.125 GHz of band edge (as shown by circles in FIG. 4) are distinctly improved.

Figure 5:
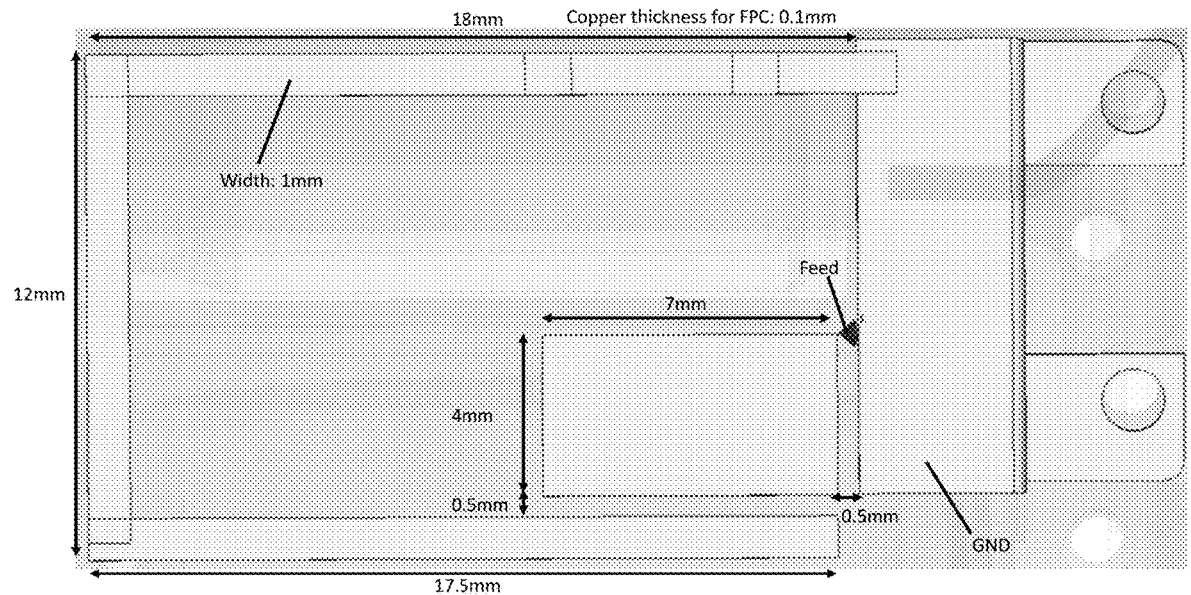
FIG. 5 is a simulation model of an antenna structure according to an embodiment of the present disclosure.

In an embodiment, when the resonance for 5.17 to 7.15 GHz is adjusted based on the D1, D3 and D4, the resonance frequency for 2.4 to 2.48 GHz may shift to lower or higher frequency. In this case, the resonance frequency of the antenna structure can further be adjusted based on the width D5 of the first section 131 and the width D6 of the second section 132, as shown in FIG. 3. FIG. 5 is a simulation model of an antenna structure according to an embodiment of the present disclosure. In FIG. 5, the detail dimension for each element of the antenna structure 10 is shown in this simulation as an example. For example, the width D5 is the same as the width D6, which is equal to 1 mm. It should be understood that the present disclosure is not limited to the dimensions shown in FIG. 5, and any appropriate dimensions may be used to implement the antenna structure 10 as long as it is capable to form the coupling antenna.

Figure 6A:
FIGS. 6a-6l are schematic structural diagrams of antenna structures according to other embodiments of the present disclosure.
Figure 6B:
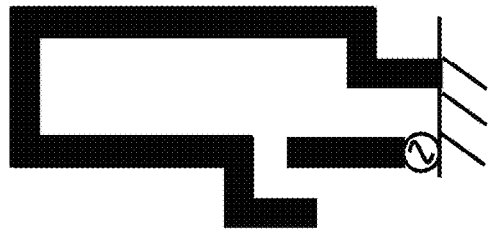
Figure 6C:
Figure 6D:
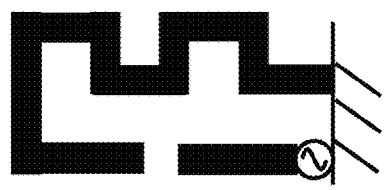
Figure 6E:
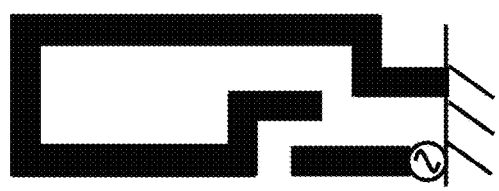
Figure 6F:
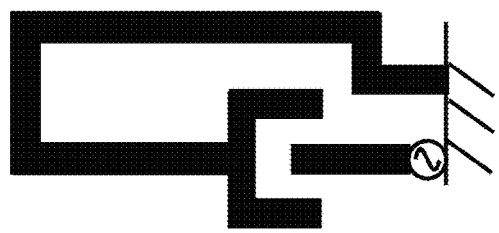
Figure 6G:
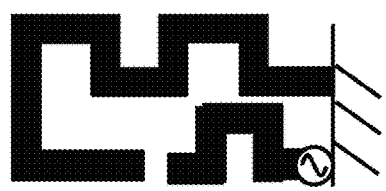
Figure 6H:
Figure 6I:
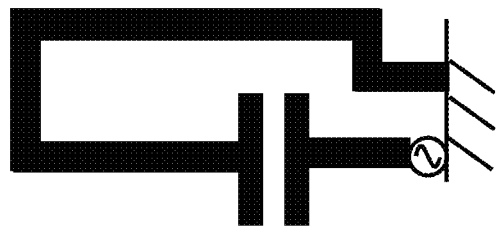
Figure 6J:
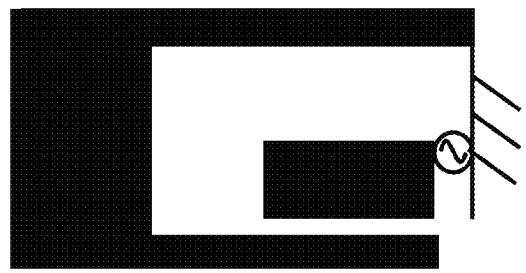
Figure 6K:
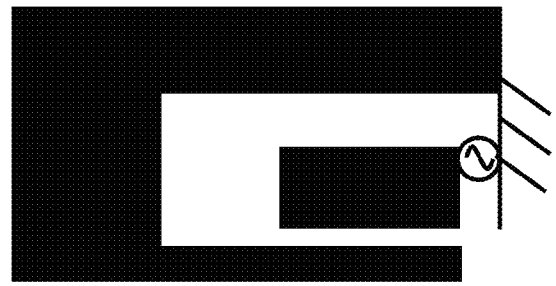
Figure 6L:
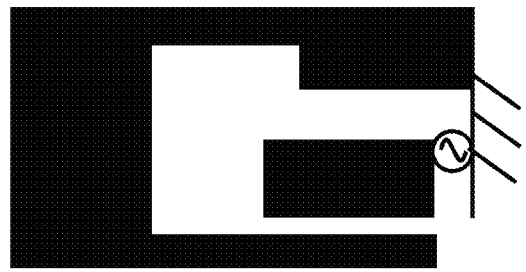

It should be noted that the antenna structure as described above is an exemplary embodiment. Some modifications are provided in the following. FIGS. 6a-6l are schematic structural diagrams of antenna structures according to other embodiments of the present disclosure. In some modified examples, the shape of the antenna element 11 may be a square, a triangle, a chamfered rectangle, a chamfered square, an L-shape or a T-shape, which will not be limited herein. The coupling portion 133a may be coupled with at least one of an upper edge, a lower edge or a side edge of the antenna element 11. In one example, the coupling portion 133a may be coupled with a second edge, shorter than a first edge, of the antenna element 11, as shown in FIG. 6a. In another example, the coupling portion 133a may include a first coupling sub-portion couple with the upper edge of the antenna element 11, and a second coupling sub-portion couple with the lower edge of the antenna element 11, as shown in FIG. 6f. In other embodiments, at least one of the first section 131, the second section 132 and the third section 133 is a curve, as shown in FIGS. 6a-6i. In other embodiments, the first section 131, the second section 132 and the third section 133 have different widths, as shown in FIGS. 6j and 6k. In the other embodiment, at least one of the first section 131, the second section 132 and the third section 133 has an uneven width, as shown in FIG. 6l.

In an implementation of the antenna structure 10, the antenna element 11, the grounding plate 12 and the grounded element 13 may be implemented in various forms. In practice, the above three elements may be located on a flexible printed circuit (FPC). For example, the antenna element 11, the grounding plate 12 and the grounded element 13 may be metallic patterns printed on a flexible film. Alternatively, these elements may be integrated in a molded interconnected device (MID) of another technique. For example, the antenna element 11, the grounding plate 12 and the grounded element 13 may be metallic patterns formed on a doped thermoplastic material through a laser direct structuring (LDS) process. Moreover, these elements may be directly printed on a part of the electronic wearable device 10 through, for example, the LDS. It is appreciated that the FPC and the MID may be implemented through other suitable techniques, which are not enumerated herein. Moreover, the first antenna element 11, the grounding plate 12 and the grounded element 13 may be physically independent from each other, namely, may be configured as separate parts in the electronic wearable device 10.

A practical application scenario for the above antenna structure will be described in the following. In a conventional electronic wearable device, the antenna may be installed to receive and transmit wireless signals. Taking a conventional AR glasses as an example, the antenna is installed inside the temple of the AR glasses. The distance between the antenna and the human body is very close since the temple is thin. In addition, no metal between the antenna and the human body. Thus, the human loss is increased because the radio wave from the antenna may be absorbed by the human body.

In view of this, an electronic wearable device is provided according to an embodiment of the present disclosure. The electronic wearable device may include at least one portion. The antenna structure as described in the above embodiments is disposed on a surface of the portion away from a user.

Figure 7:
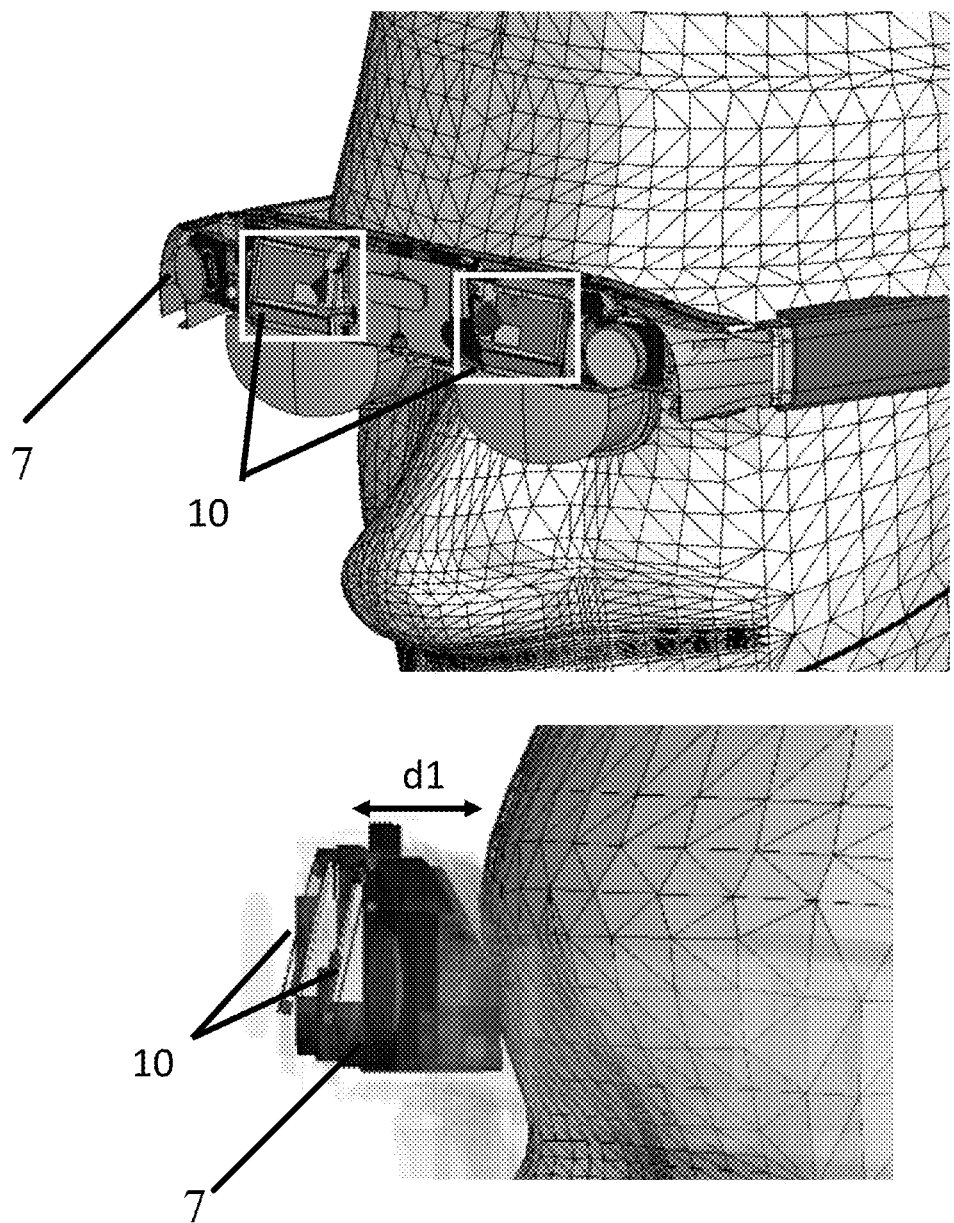
FIG. 7 is an application scenario of an electronic wearable device according to an embodiment of the present disclosure.

FIG. 7 is an application scenario of an electronic wearable device according to an embodiment of the present disclosure. As shown in FIG. 7, the electronic wearable device is eyeglasses. The eyeglasses may be a VR glasses, an AR glasses, or the like, and may be used for playing games or acquiring instant message, which is not limited herein. The eyeglasses include one or two lenses that are disposed in front of eyes of the wearer when being worn. In this embodiment, the left lens (corresponding to the left eye) serves as the portion, and one element structure 10 is disposed on an outside surface of the left lens. Alternatively, two lenses serve as two portions, and two element structures 10 are respectively disposed on outside surfaces of the left lens and the right lens.

In one embodiment, the portion is configured to be disposed in front of an eye of the user when the electronic wearable device 7 is worn by the user. Generally, the wireless signals would attenuate drastically when passing through the human body. A strategy to address such issue may be disposing the antenna away from the human body as far as possible. In case of providing visual information, such portion generally includes a lens or a set of lenses, and thereby should be disposed away from the wearer to provide adequate space for optical assembly. Thus, the antenna structure 10 is considered to be disposed on a surface of the portion away from a user. Therefore, in the above case, it is quite easy to dispose the antenna structure 10 at a position where the transmission or reception of first electromagnetic waves is subject to little influence from the human body.

The antenna structures 10 may be arranged in various positions of the electronic wearable device 7. In one embodiment, the antenna structures 10 are located at opposite sides of a body part of the user when the electronic wearable device 7 is worn by the user. Generally, the body part protrudes from the body of the user, such as the nose, an ear, or a finger of the user. Alternatively, the body part may be the head, the torso, or a limb of the user. Most radio-frequency electromagnetic waves attenuate rapidly when passing the human body. Hence, the body part serves isolation between the two antenna structures, such that interference between two channels of wireless communication would be greatly reduced.

In this embodiment, the antenna structure 10 does not contact skin of the user when the electronic wearable device 7 being worn by the user. As shown in FIG. 7, the antenna structure 10 is disposed on the surface of the lens away from the user. Thus, the first antenna structure 13 is separated from the skin of the user by a distance d1 greater than zero. The distance d1 between the antenna structure 10 and the face of the wearer can be keep when the electronic wearable device 7 is worn. As shown in FIG. 7, when the eyeglasses are worn by the user, the antenna element 10 is separated from the face of the user by the distance d1. Such distance would ensure good quality of wireless communication in wavelength bands of most conventional wireless communication standards, such as Wi-Fi, Bluetooth®, GPS and 2G to 5G cellular network standards.

Figure 8:
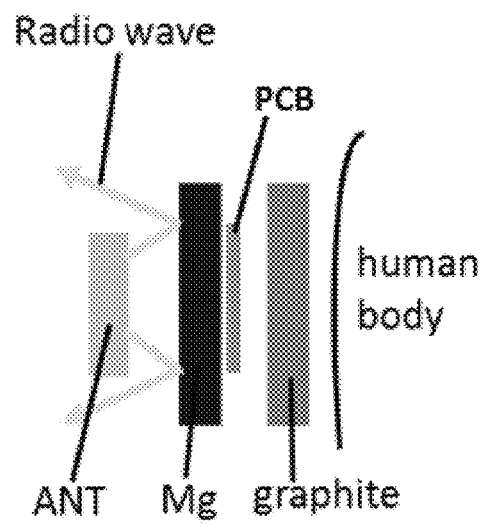
FIG. 8 is a cross section view of a portion of an electronic wearable device according to an embodiment of the present disclosure.

In an embodiment of the present disclosure, the portion may include at least one metal portion. FIG. 8 is a cross section view of a portion of an electronic wearable device according to an embodiment of the present disclosure. It is considered that the electronic wearable device needs the mechanical strength and the thermal countermeasure. Thus, some metal portions are disposed inside the electronic wearable device. As shown in FIG. 8, a magnesium frame, Printed Circuit Board (PCB) and a graphite sheet are provided between the antenna structure and the human body. The absorption of radio wave can be prevented by these metal parts. Therefore, the human loss is decreased by providing the metal part.

Figure 9:
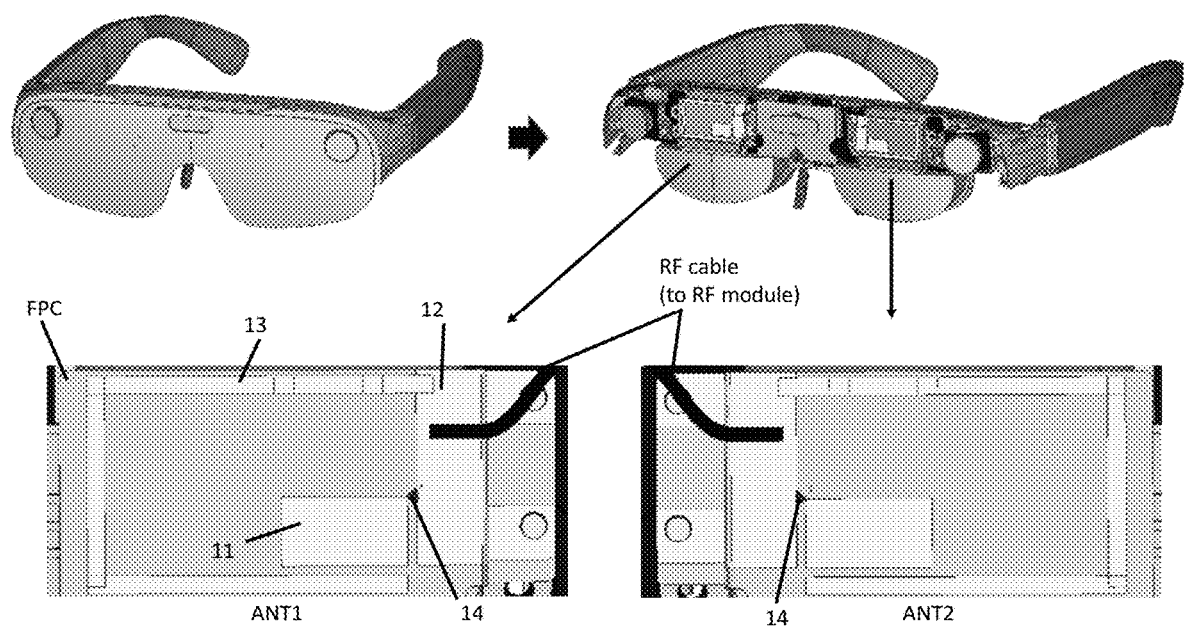
FIG. 9 is a simulation model of an electronic wearable device according to an embodiment of the present disclosure.

In an embodiment, the electronic wearable device 7 includes at least two portions. Each of the at least two portions is disposed with the antenna structure 10. FIG. 9 is a simulation model of an electronic wearable device according to an embodiment of the present disclosure. In FIG. 9, at least two portions generally are two lenses, and two antenna structures 10 are respectively disposed on the outside surfaces of the two lenses.

Specifically, the electronic wearable device 7 may further include a right lens and a left lens, which are disposed in front of the eye the user when the electronic wearable device 10 is worn by the user. A right antenna is disposed on an outside surface of the right lens, and a left antenna is disposed on an outside surface of the left lens. The right antenna and the left antenna form a multiple-input-multiple-output (MIMO) system or a diversity system.

In an embodiment, as shown in FIG. 9, both the right antenna and the left antenna have the same size and the same structure. The right antenna is symmetrical to the left antenna. Details and structures of the right antenna and the left antenna may refer to the above embodiments, which are not repeated herein.

The above configurations of the portion disposed with the antenna structure may be applied to various types of electronic wearable devices. Considering the lens disposed in front of an eye or eyes of the wearer, the electronic wearable device may be, but is not limited to, eyeglasses, a helmet, or a headwear display.

It is appreciated that embodiments of the present disclosure is not limited to devices having lens, but may be applied to nearly all kinds of electronic wearable devices having a function of wireless communication, such as an earphone, an electronic wristband, an electronic watch, or the like.

Figure 10:
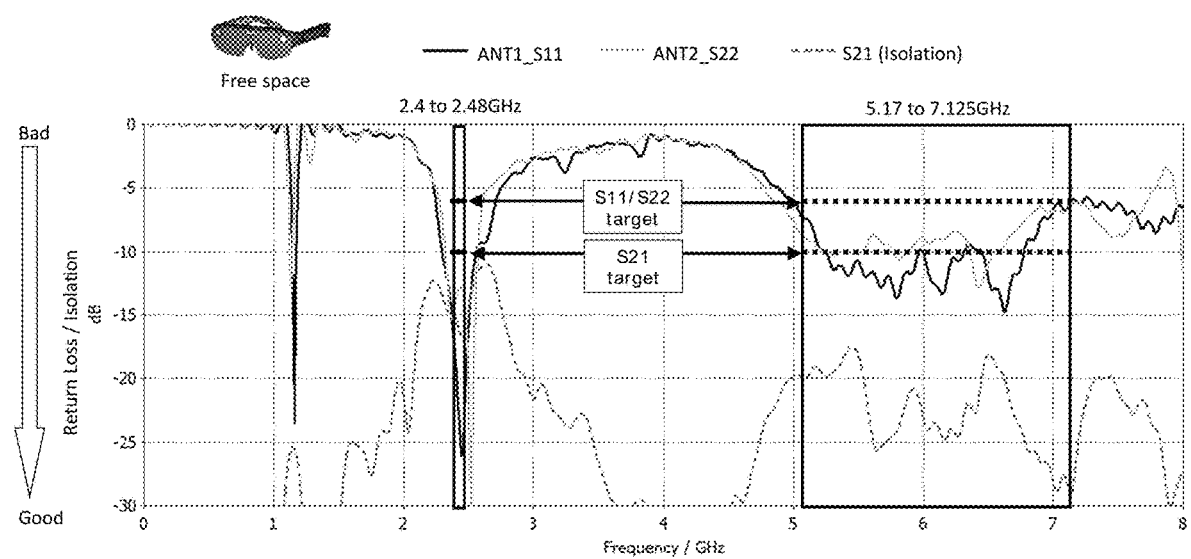
FIG. 10 is a graph of a return loss and an isolation of antenna structures when eyeglasses are disposed in a free space.
Figure 11:
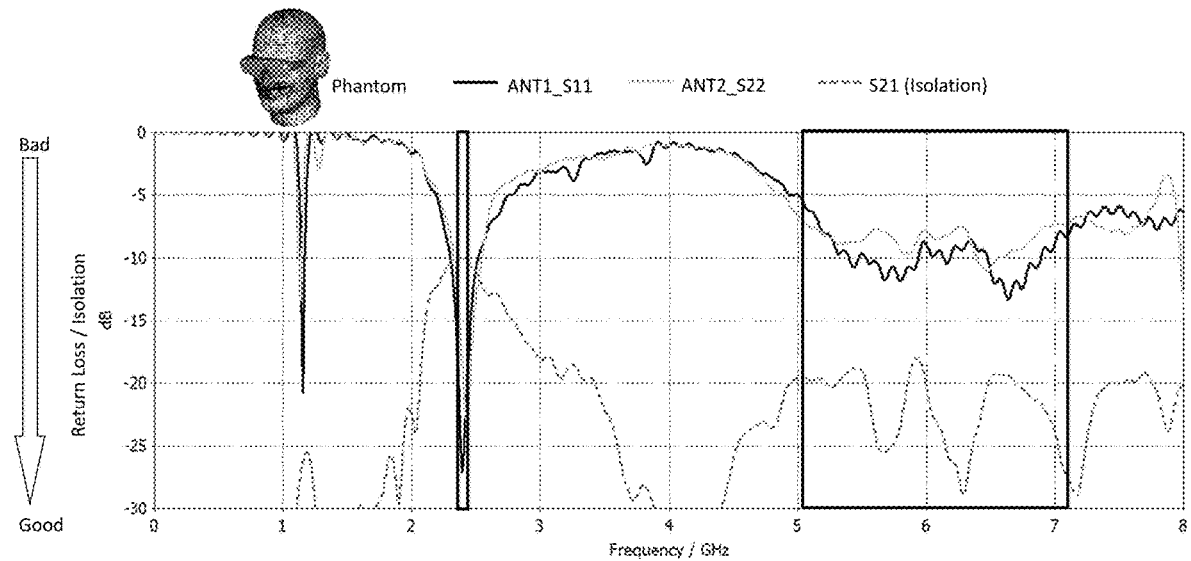
FIG. 11 is a graph of a return loss and an isolation of antenna structures in eyeglasses with a phantom.

Performances of the eyeglasses as illustrated above are shown in FIG. 10 to FIG. 16b. Reference is made to FIGS. 10 and 11, which show graphs of return losses and isolation of antenna structures. In FIGS. 10 and 11, the black lines represent s11 parameters (return losses) of one antenna structure (i.e., right antenna structure or left antenna structure) in a frequency band ranging from 0 GHz to 8 GHz, the gray lines represent s22 parameters of another antenna structure (i.e., left antenna structure or right antenna structure) in the above frequency band, and the black dotted lines represents an isolation S21 between the two antenna structure (i.e., both right antenna structure and left antenna structure).

Specifically, FIG. 10 corresponds to the eyeglasses as shown in FIG. 9, which are disposed in a free space. In addition, an S11 target, an S22 target and an S21 target are marked in FIG. 10. Based on the simulation result, both the right antenna structure and the left antenna structure have a good performance because the return losses of two antenna structures are lower than −6 dB in Wi-Fi6E frequency range. In addition, the isolation between two antenna structures can be kept under −10 dB. Thus, the antenna structure as shown above has a good performance when which is disposed in a free space. FIG. 11 corresponds to the eyeglasses as shown in FIG. 9, which have a standard phantom. Referring to the above targets, the antenna structure also has a good performance when which is worn by a standard phantom.

Figure 12:
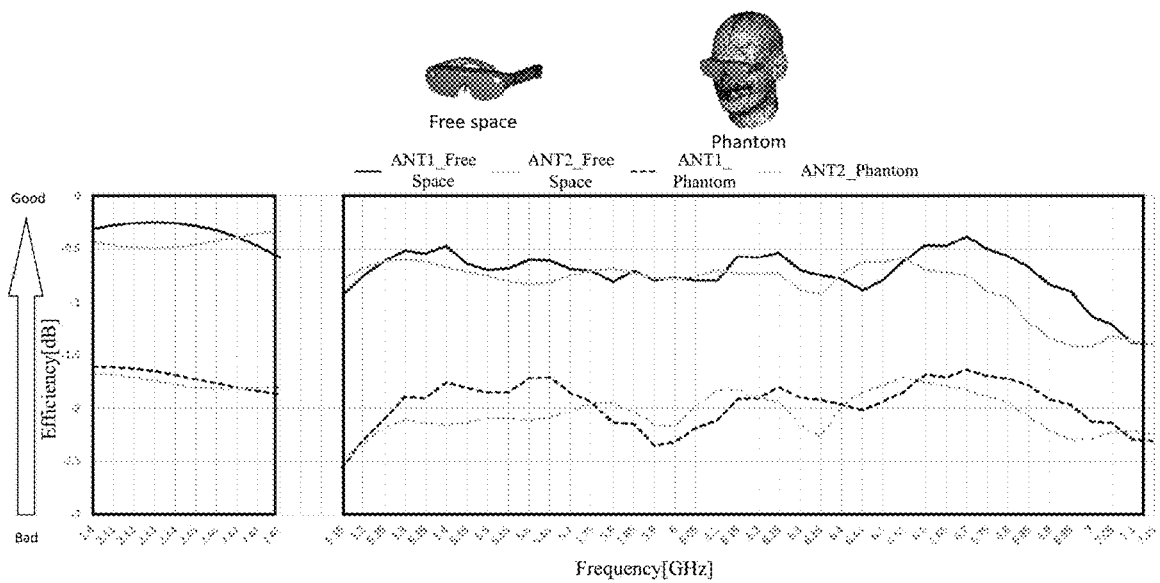
FIG. 12 is a graph of efficiencies of right and left antenna structures, respectively, when an electronic wearable device is in free space and worn in phantom according to an embodiment of the present disclosure.

FIG. 12 is a graph of efficiencies of right and left antenna structures, respectively, when an electronic wearable device is in free space and has phantom (i.e., when being worn) according to an embodiment of the present disclosure. In FIG. 12, the black solid line represents an antenna efficiency of a right antenna structure in free space, the grey solid line represents an antenna efficiency of a left antenna structure in free space, the black dotted line represents an antenna efficiency of the right antenna structure in phantom, and the grey dotted line represents an antenna efficiency of the left antenna structure in phantom. Based on the graphs, the performances of the right antenna structure and the left antenna structure are good. That is because the antenna efficiencies of two antenna structures are around 0.5 to 1.5 dB when the eyeglasses are in free space, and around 1.5 to 2.5 dB when the eyeglasses are worn by the user, which are all quite lower than that of the conventional antenna. It can be seen from FIG. 12 that performances of the two antenna structures are quite satisfactory for the wireless communication in the two wavelength bands.

Figure 13A:
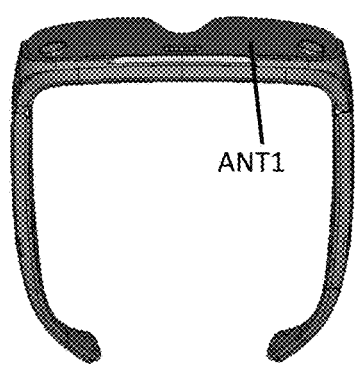
FIGS. 13a and 13b are graphs of radiation patterns of a right antenna structure and a left antenna structure in a second wavelength band when the eyeglasses are in free space according to an embodiment of the present disclosure.
Figure 13A:
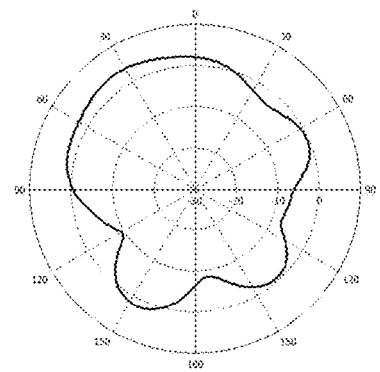
Figure 13A:
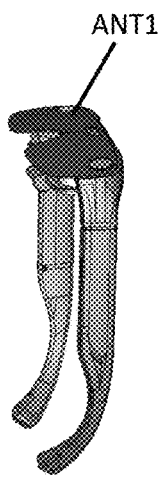
Figure 13A:
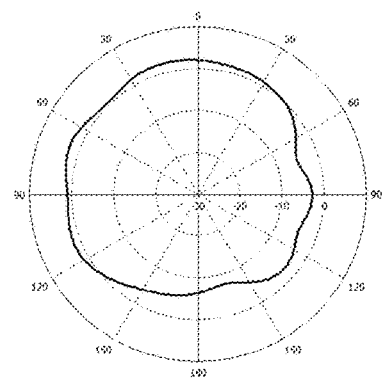
Figure 13B:
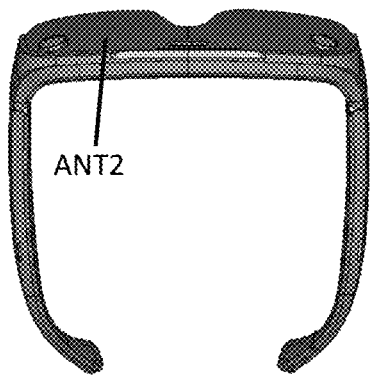
Figure 13B:
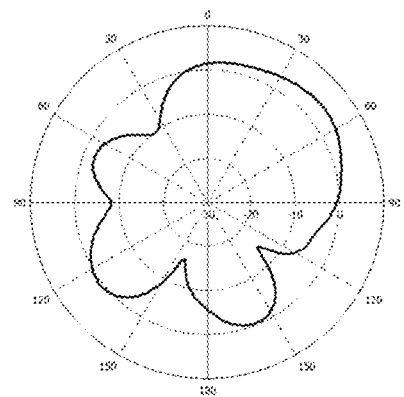
Figure 13B:
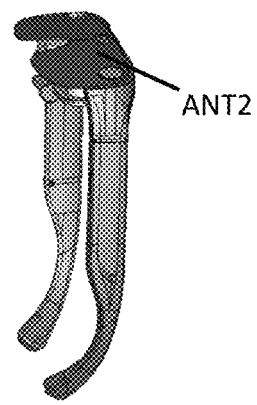
Figure 13B:
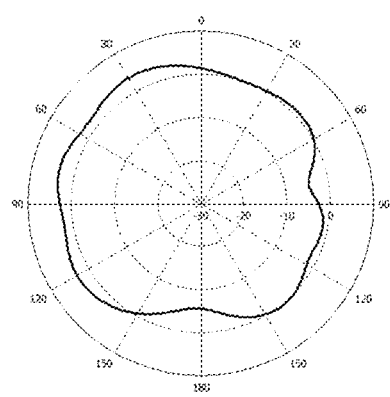
Figure 14A:
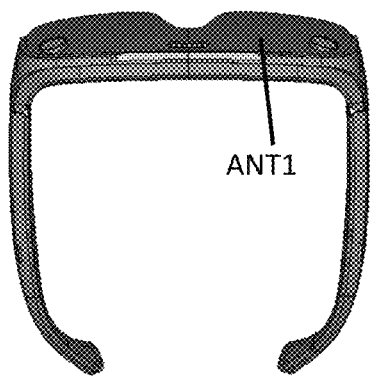
FIGS. 14a and 14b are graphs of radiation patterns of a right antenna structure and a left antenna structure in a first wavelength band when the eyeglasses are in free space according to an embodiment of the present disclosure.
Figure 14A:
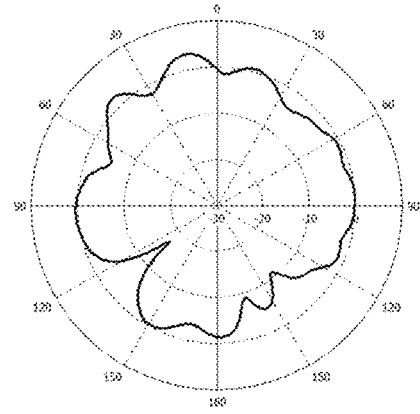
Figure 14A:
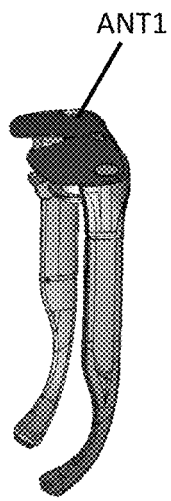
Figure 14A:
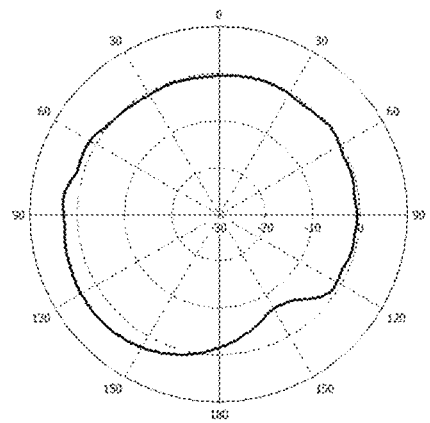
Figure 14B:
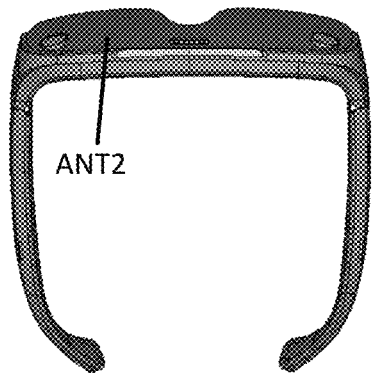
Figure 14B:
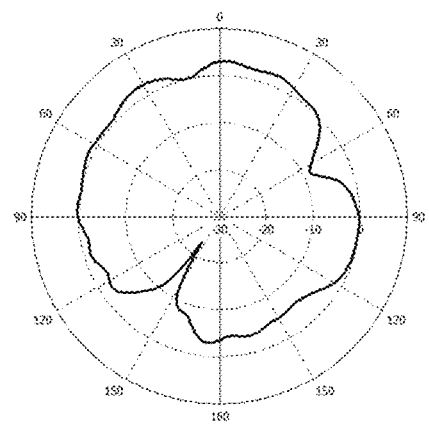
Figure 14B:
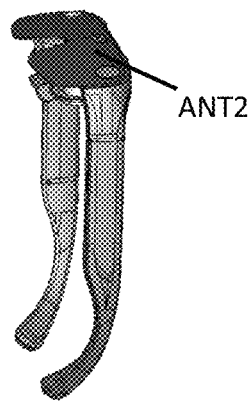
Figure 14B:
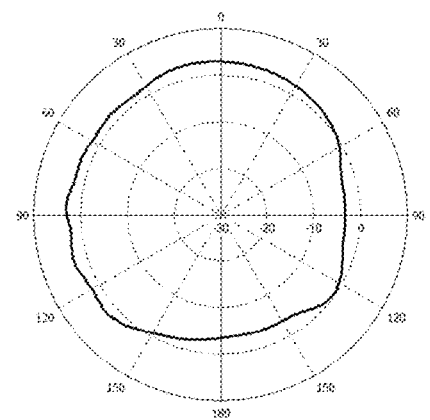
Figure 15A:
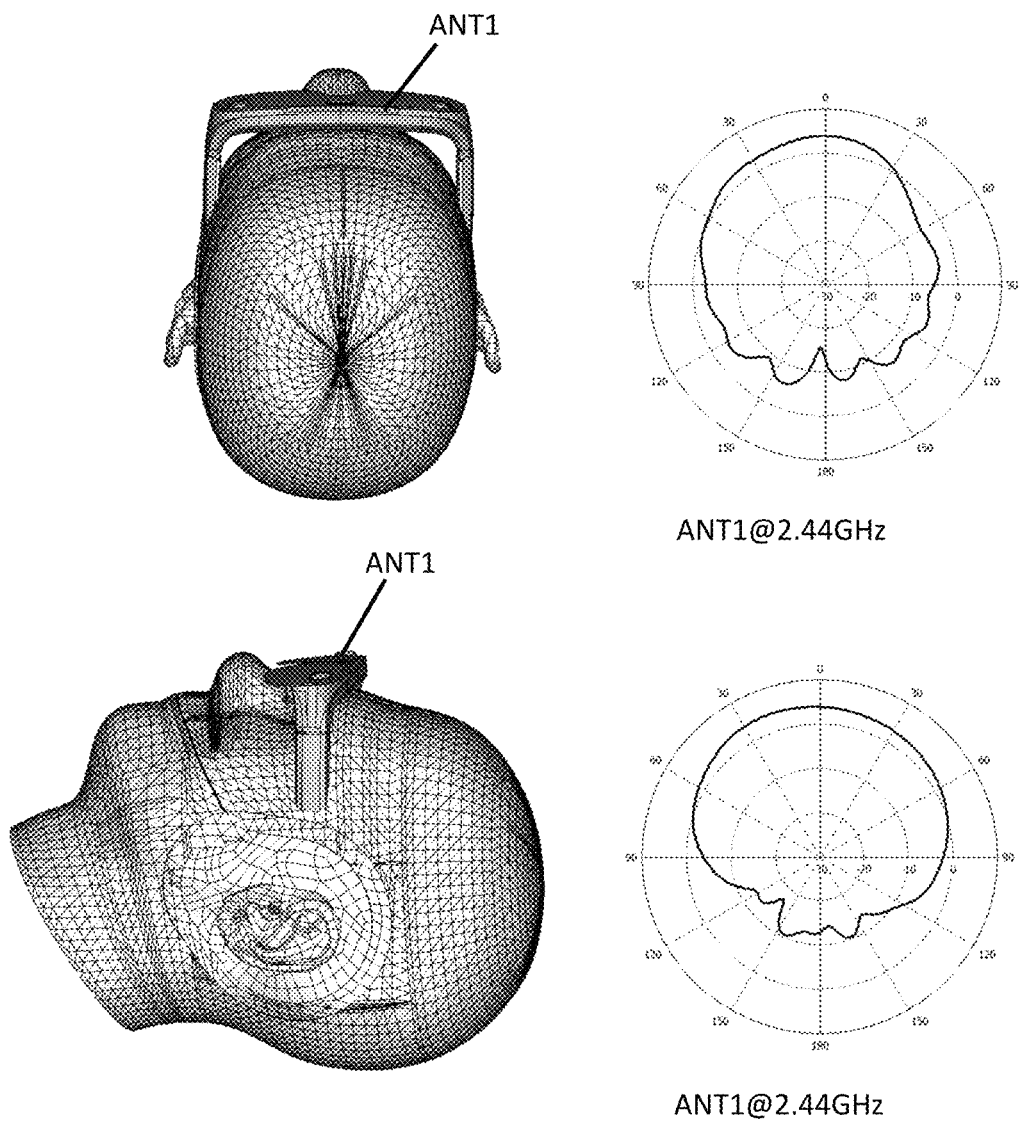
FIGS. 15a and 15b are graphs of radiation patterns of a right antenna structure and a left antenna structure in a second wavelength band when the eyeglasses are worn in phantom according to an embodiment of the present disclosure.
Figure 15B:
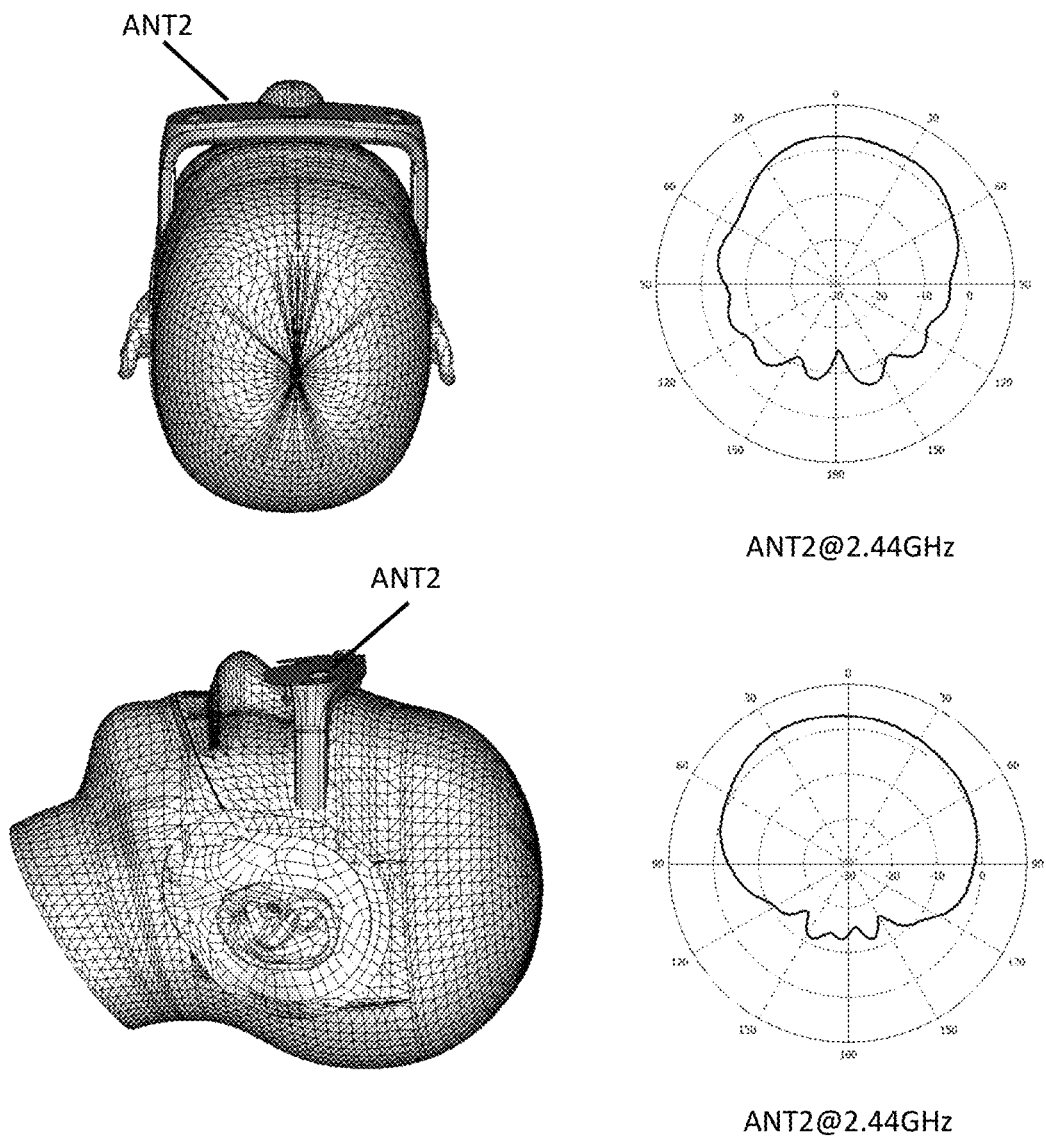
Figure 16A:
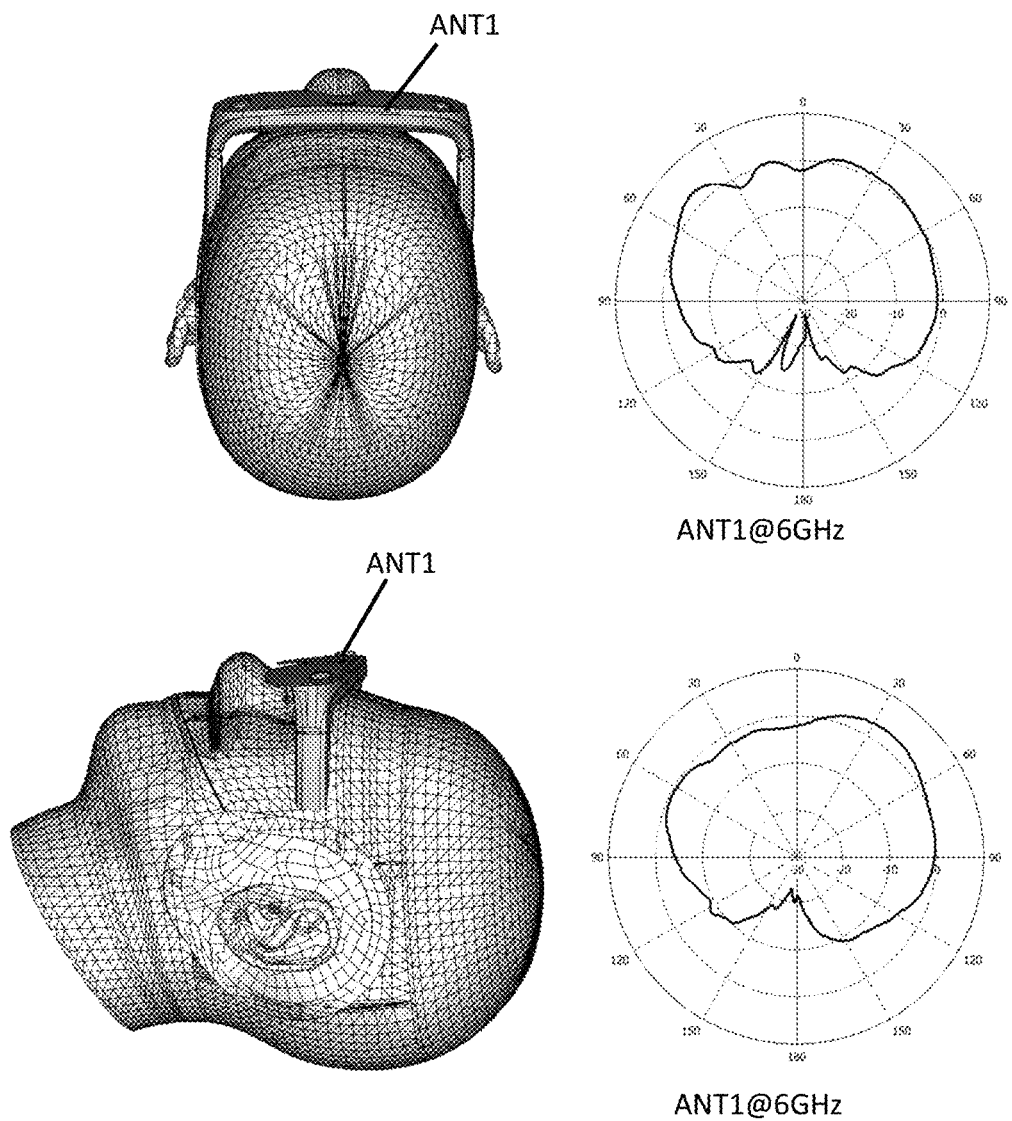
FIGS. 16a and 16b are graphs of radiation patterns of a right antenna structure and a left antenna structure in a first wavelength band when the eyeglasses are worn in phantom according to an embodiment of the present disclosure.
Figure 16B:
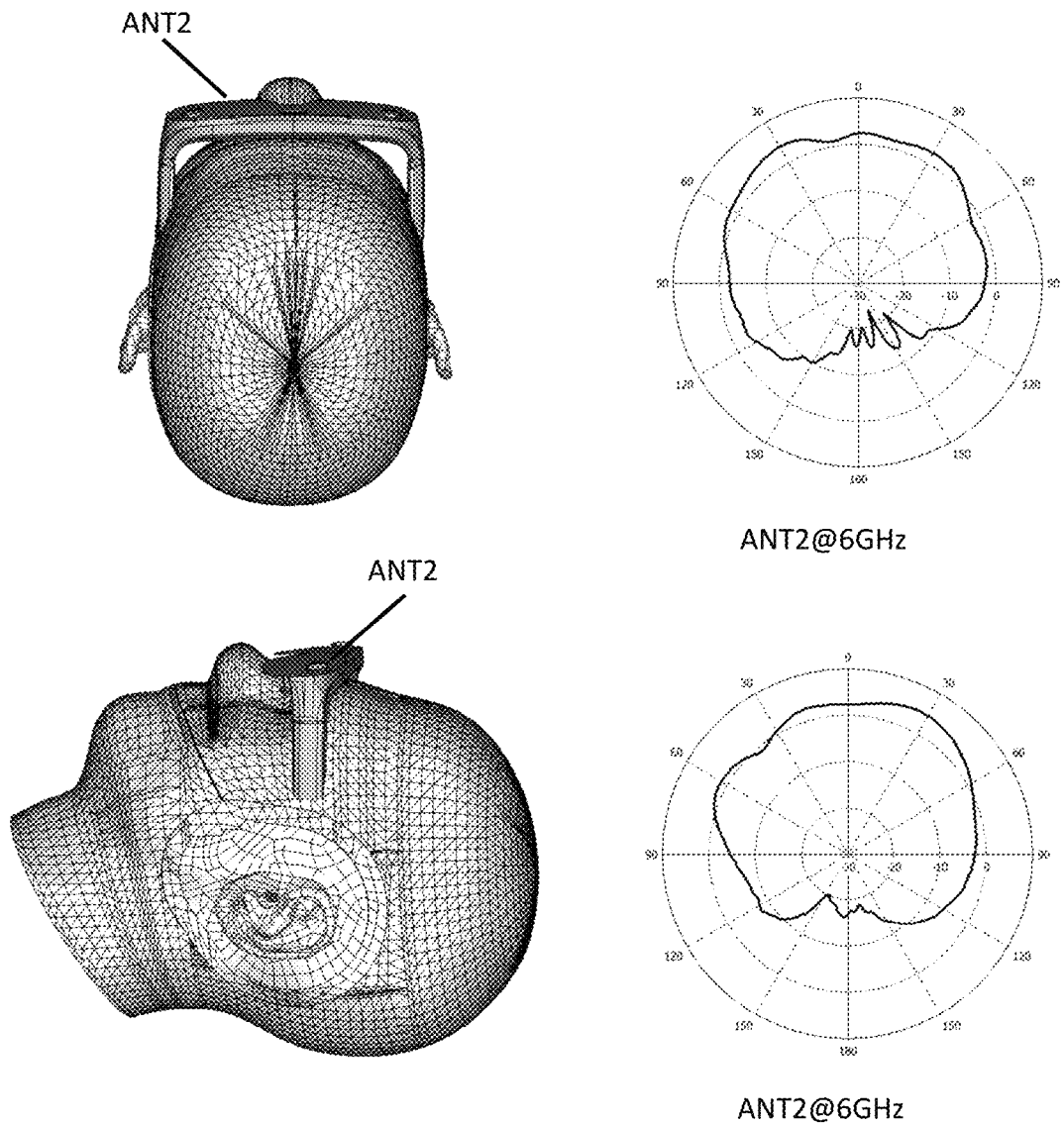

Reference is further made to FIGS. 13a and 16b. FIGS. 13a and 13b are graphs of radiation patterns of a right antenna structure and a left antenna structure in a second wavelength band when the eyeglasses are in free space according to an embodiment of the present disclosure. FIGS. 14a and 14b are graphs of radiation patterns of a right antenna structure and a left antenna structure in a first wavelength band when the eyeglasses are in free space according to an embodiment of the present disclosure. In an embodiment, the first wavelength band ranges from 5.17 GHz to 7.125 GHz, and the second wavelength band ranges from 2.4 GHz to 2.48 GHz. In addition, FIGS. 15a and 15b are graphs of radiation patterns of a right antenna structure and a left antenna structure in a second wavelength band when the eyeglasses are worn in phantom according to an embodiment of the present disclosure. FIGS. 16a and 16b are graphs of radiation patterns of a right antenna structure and a left antenna structure in a first wavelength band when the eyeglasses are worn in phantom according to an embodiment of the present disclosure. It can be seen from FIGS. 16a and 16b that the radiation is nearly uniform in all directions, except for a direction pointing to the head. The reason lies in that there are various tissues and organs (even bones) along such direction besides the skin and the cartilage, thereby hindering propagation of electromagnetic signals. It is appreciated that such direction would not significantly influence the performances of the eyeglasses.

The embodiments of the present disclosure are described in a progressive manner, and each embodiment places emphasis on the difference from other embodiments. Therefore, one embodiment can refer to other embodiments for the same or similar parts.

According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but confirms to a widest scope in accordance with principles and novel features disclosed in the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. An antenna structure, comprising:
    an antenna element, a grounding plate and a grounded element, and wherein
    the grounded element is electrically connected to the grounding plate to ground, and
    the antenna element is mounted to the grounding plate, and is configured to transmit and receive wireless signals in a first wavelength band of a first wireless communication standard, and couple with the grounded element to transmit and receive wireless signals in a second wavelength band of a second wireless communication standard, wherein the first wavelength band is different from the second wavelength band,
    wherein the grounded element is in a stripe shape,
    wherein the antenna element is in a rectangle shape,
    wherein the grounded element comprises a first end electrically connected to the grounding plate, and a second end provided with a coupling portion, wherein the coupling portion is configured to couple with the antenna element,
    wherein the antenna element at least comprises a first edge facing the coupling portion of the grounded element and a second edge perpendicular to the first edge, wherein the first edge is longer than the second edge, and
    wherein a length of the coupling portion is equal to a length of the first edge of the antenna element.

2. The antenna structure according to claim 1, wherein a gap is located between the antenna element and the coupling portion of the grounded element to form a coupling capacitance.

3. The antenna structure according to claim 2, wherein the second wavelength band is adjusted according to a parameter of the coupling capacitance.

4. The antenna structure according to claim 3, wherein the parameter of the coupling capacitance comprises at least one of a length of the coupling portion and a width of the gap.

5. The antenna structure according to claim 1, wherein the antenna element is located in a region defined by the grounded element and the grounding plate.

6. The antenna structure according to claim 5, wherein a front edge of the grounded element is aligned with an edge of the antenna element adjacent to the grounding plate.

7. The antenna structure according to claim 1, wherein the antenna element, the grounding plate and the grounded element are located on a printed circuit board; or
    the antenna element, the grounding plate and the grounded element are integrated in a molded interconnect device by laser direct structuring.

8. The antenna structure according to claim 1, wherein the antenna element is a monopole antenna, a dipole antenna, a loop antenna, or an inverted-F antenna.

9. An electronic wearable device, comprising:
    at least one portion, wherein the antenna structure according to claim 1 is disposed on a surface of the portion away from a user.

10. The electronic wearable device according to claim 9, wherein the portion comprises at least one metal portion, and the metal portion is disposed between the antenna structure and the user.

11. The electronic wearable device according to claim 9, wherein the portion disposed with the antenna structure is separated from skin of the user when the electronic wearable device is worn by the user.

12. The electronic wearable device according to claim 11, wherein the portion is located in front of an eye of the user, when the electronic wearable device is worn by the user.

13. The electronic wearable device according to claim 9, wherein the electronic wearable device comprises at least two portions, and the antenna structure is disposed on each of the at least two portions.

14. The electronic wearable device according to claim 13, wherein the antenna structures are symmetrically disposed on surfaces of the at least two portions away from the user, respectively.

15. The electronic wearable device according to claim 13, wherein the antenna structures form a multiple-input-multiple-output system or a diversity system.

16. The electronic wearable device according to claim 13, wherein the two portions are located in front of eyes of the user respectively, when the electronic wearable device is worn by the user.

* * * * *